Patented Mar. 14, 1950

2,500,147

UNITED STATES PATENT OFFICE 2,500,147

REDUCING AGENT COMPRISING GLUCO-SIMIN DECOMPOSITION PRODUCTS AND PROCESS OF PRODUCING SAME

Roland E. Gunther, Oceanside, and Moritz Kohn, New York, N. Y., and Donald C. Stone, East Orange, N. J., assignors to Dehls & Stein, Inc., a corporation of New Jersey No Drawing. Application July 1, 1948, Serial No. 36,424

12 Claims. (Cl. 99—48)

This application relates to a reducing agent to protect bottled beer and ales from the injurious effects of oxygen and is based upon our discovery that if glucosimin (Beilstein, vol. 1, page 902) is heated to an elevated temperature, it undergoes decomposition with the formation of powerful reducing agents.

If one treats the dry glucosimin powder described in the literature, this decomposition will take place at the melting point of the powder (about 123° C.) but ordinarily it is preferable to treat the material in an aqueous solution and in such case somewhat lower temperatures are advisable. Excellent results can be had at a temperature of about 100° C. and one can go even lower. The extent of decomposition and the rate with which the desired products are formed is a function of both time and temperature. For example, where proper decomposition can be obtained in 10 minutes at 100° C., at 90° C. an hour might be needed. At lower temperatures the time will increase. It will be noted that as the reaction proceeds, the glucosimin solution darkens.

There are a number of methods of determining the right time to stop the reaction but the most accurate is to test the solution for its reducing power. Many such tests are known. For example, the action of our compound can be titrated with a sodium 2,6-dichloro-benzenone-indophenol solution. When proper decomposition has taken place it is not necessary to use more than a one-half gram sample of a 38° Bé. solution of the new product to reduce as much as 1¼ cc. of a .005 molar solution of the above compound in about one minute at 20° C. so as to eliminate all color from it. Preferably we continue the heating until the color will thus be eliminated from at least 2½ cc. of the indicator but within the specification stated valuable results will be had. The time at which the reaction must be stopped is not extremely critical and there will be an appreciable margin within which this degree of activity will be had before the reaction goes too far.

As stated above, when the glucosimin is heated, it will be noted that the solution starts to darken almost immediately and finally becomes almost black. Our experience indicates that the proper reactivity will be had when the tinctorial strength of the glucosimin decomposition solution reaches about 500 on the Lovibond scale (series 52 with ½-inch cell) and preferably the heating should be stopped before the product reaches a tinctorial strength of 3000 on that scale. Our experience indicates that within the color range stated the compound will meet the stated specification of reaction.

It will also be noted that during the initial heating some ammonia is evolved, but by the time the desired reaction has occurred, evolution of free ammonia has stopped. At the same time there is a drop in the pH value. A 10% aqueous solution of glucosimin has a pH of about 9.6. After being heated to the point where it has the necessary reducing properties, it will be found that the pH will have dropped to about 8.5 and this may be brought down much lower even to the point where the solution is slightly on the acid side, say to a pH of about 6.2.

Up to this point we have described our product as made by first producing glucosimin and then decomposing this, preferably in aqueous solution. This approach is of help in determining the nature of the product, but the cost of production can be greatly reduced if various steps are carried out simultaneously. For example, we can start with glucose or an aqueous solution of dextrose hydrate and gradually add aqueous ammonia to it at a temperature in the order of about 100° C. In such case the glucosimin is formed in solution and then is decomposed, so that the final product will meet the tests indicated above.

In place of pure dextrose, we may employ other hexoses. For example, we may use starch conversion products such as cereal sugars or corn syrup. This latter product ordinarily is a mixture of dextrose, dextrins and maltose. Other hexoses may be employed if found commercially available. These starting substances yield either the same or equivalent final products. As previously indicated, the temperature of reaction is not critical (though when working with a solution, the temperature should not exceed 120° C.) but the time of treatment may have to be greatly prolonged if the temperature is substantially lower. For all practical purposes the temperature should be between 60° C. and 120° C. and a temperature in the order of about 100° C. gives excellent results.

Our process may be readily understood from the following illustrative example:

4300 parts of dextrose hydrate was melted with approximately 20% of its weight of water to produce a syrup having a specific gravity of 38° Bé. The melting was carried out at a temperature of about 100° C. Into this melt 385 parts of an aqueous ammonia solution having a gravity of 26° Bé. was gradually introduced so that the loss of ammonia would be kept to a minimum. The time consumed for running the ammonia into the melt was about one hour.

This produced a usable solution, but ordinarily it is advisable to continue the heating for a short time after the last of the ammonia has been added, so as to be sure that it has reacted and that no substantial amount of free ammonia remains in the solution. Tests can be run to ascertain whether the product has the reducing power indicated above and if it does not, the heating is continued for a short additional period.

In this example the amount of ammonia is theoretically deficient to give quantitative yields of glucosimin. If the full equivalent of ammonia or an excess is used, the hexose is employed to the best advantage. However, the trade objects to the introduction of any free ammonia into the beer, and therefore it is ordinarily preferable to have a slight deficiency of ammonia. An efficient way of operating is to use approximately the theoretical amount of ammonia and then add a slight excess of dextrose toward the end of the reaction. This will take up any free ammonia that remains.

The procedure which we follow in making our test for minimum reducing power is to use a one-half-gram sample at a specific gravity of 38° Bé. 10 cc. of distilled water at 20° C. is then added and the solution is buffered to a pH of 4.3. The indicator is then added, and if the solution has the essential reducing power, it should be possible to add at least 1¼ cc. of the indicator without color remaining after one minute, and preferably one should be able to add as much as 2½ cc. and still have the color thus eliminated.

As indicated, we have generally found that the heating should be stopped before the tinctorial strength exceeds 3000 on the Lovibond scale. This is advantageous as we wish our material to be used without adding materially to the color of the beer. However, if darkening of the beer is not objectionable, the heating may be continued further, provided one stops before tests show that the reducing power of the mixture has dropped below the minimum value given. If a very low pH is desired in the product without the development of too much tinctorial strength, the mixture may be subjected to heating under vacuum which will assist in the removal of uncombined ammonia.

In making the test for tinctorial strength, we find it advantageous to follow the practice of making a solution containing 10% solids and testing this in a $\frac{1}{16}$-inch cell. The values are then calculated to the tinctorial strength that would be shown in a ½-inch cell.

The product of our invention may be described as an aqueous solution of thermal decomposition products of glucosimin having sufficient reducing power so that one-half gram of a 38° Bé. solution of the new product will reduce at least 1¼ cc. of a .005 molar solution of sodium 2,6-di-chlor-benzenone-indophenol in one minute at 20° C. Our product made as herein stated will meet this specification when it has a tinctorial strength of between 500 and 3000 on the Lovibond scale.

Another characterization of the product is that it shows appreciable nitrogen on a determination by the Kjeldahl method and substantially higher nitrogen on a determination by the Dumas method. For example, in a 38° Bé. solution the nitrogen content on a determination by the Kjeldahl method ordinarily will show in excess of 1%, and the nitrogen determination by the Dumas method will be from 30% to 70% higher (based on the Kjeldahl determination). Thus in one example the Kjeldahl determination showed 1.7% nitrogen and the Dumas determination showed 2.5% nitrogen. This excess of nitrogen on the Dumas determination as compared with the Kjeldahl determination indicates that a part of the total nitrogen has gone into cyclic combination in our product. The pH value will ordinarily be between 6.2 and 8.5.

Our new product has extremely valuable qualities in preventing or counteracting the deleterious effects of air in bottled beer or ale. It has long been recognized that air (oxygen) shortens the shelf life of beer. Our product acts in the nature of a buffer and prevents the proteins from being denatured by the presence of oxygen. The proteins are put into such a form that they will not coagulate and as a result the beer retains its original brilliance and taste for a longer period and the bottled beer or ale shows a marked increase in chill-proof properties.

In using our product it is added to the beer or ale just prior to the final filtration. The amount to be employed will depend upon the reducing property of the particular material employed and the amount of air in the beer. A computation is made to ascertain the amount of air that will be present in each bottle (12 ounces) of beer or ale. If the new product has the minimum specification of reducing strength stated above, we recommend that there be added to each 100 barrels of beer or ale 2 pounds of the new product for each ½ cc. of air computed to be present in each bottle. Actually, we prefer to use a product having a reducing specification double the minimum stated above and in that case the amount to be employed can be cut in half.

It is understood that this is given merely as a recommendation of a good working percentage of the new product to be employed and is not intended as a limitation on its use.

What we claim is:

1. The process of producing a reducing agent for use in bottled beer and ale which comprises treating an hexose in aqueous solution with ammonia at a temperature of between 60° C. and 120° C., continuing the heating until there is no substantial evolution of ammonia and until the mass has developed a tinctorial value of at least 500 on the Lovibond scale (series 52—½-inch cell) and cooling the mass before the reducing value drops below the point where one-half gram at 38° Bé. sp. gr. will decolorize 1¼ cc. of a .005 molar solution of sodium 2,6-di-chloro-benzenone-indophenol in one minute at 20° C.

2. A process as specified in claim 1 in which the hexose sugar is dextrose.

3. A process as specified in claim 1 in which the dextrose is present in excess over equal molecular proportions relative to the ammonia.

4. A process as specified in claim 1 in which ammonia is present in at least equal molecular proportions relative to the dextrose.

5. A process as specified in claim 1 in which the mass is cooled before the tinctorial strength exceeds 3000 on the said Lovibond scale.

6. A process as specified in claim 1 in which the reaction is conducted at a temperature of approximately 100° C.

7. A reducing agent for the purpose specified consisting of reaction products of ammonia and an hexose in aqueous solution having a tinctorial value of between 500 and 3000 on the Lovibond scale (series 52—½-inch cell) characterized by the fact that in a 38° Bé. solution it shows in excess of 1% nitrogen on a Kjeldahl determination and on the Dumas determination shows from 30% to 70% more nitrogen (based on the Kjeldahl determination) than on the Kjeldahl determination, and having a pH of between 6.2 and 8.6.

8. A process of producing a reducing agent which comprises treating glucosimin at a temperature of between 60° C. and 123° C. until one-half gram of the material in an aqueous solution of 38° Bé. sp. gr. will decolorize at least 1¼ cc. of a .005 molar solution of sodium 2,6-di-chloro-benzenone-indophenol in one minute at 20° C., and cooling the mass to room temperature before decomposition continues to the point where the reducing power falls below that value.

9. A process of producing a reducing agent which comprises heating an aqueous solution of glucosimin at a temperature of between 60° C. and 120° C. until solution has developed a tinctorial value of at least 500 on the Lovibond scale (series 52—½-inch cell) and cooling to room temperature before the tinctorial value exceeds 3000 on that scale.

10. A reducing agent for the process specified consisting of thermal decomposition products of glucosimin in aqueous solution characterized by the fact that such decomposition products have sufficient reducing power so that one-half gram of the solution at 38° Bé. sp. gr. will substantially eliminate the color of at least 1¼ cc. of a .005 molar solution of sodium 2,6-di-chloro-benzenone-indophenol in one minute at 20° C.

11. A method of improving the shelf life and chill-proof qualities of beer and ale which comprises adding to the brew before bottling, thermal decomposition products of glucosimin in aqueous solution having a tinctorial strength of between 500 and 3000 on the Lovibond scale (series 52—½-inch cell) in an amount approximately equivalent to one pound per 100 barrels of brew for each ½ cc. of air computed to be present in each 12 ounces of the brew.

12. A method of improving the shelf life and the chill-proof qualities of beer and ale which comprises adding to the brew before bottling, reaction products of ammonia and an hexose in aqueous solution having a tinctorial strength of between 500 and 3000 on the Lovibond scale (series 52—½-inch cell) in an amount approximately equivalent to one pound per 100 barrels of brew for each ½ cc. of air computed to be present in each 12 ounces of the brew.

ROLAND E. GUNTHER.
MORITZ KOHN.
DONALD C. STONE.

REFERENCES CITED

The following references are of record in the file of this patent:

UNITED STATES PATENTS

| Number | Name | Date |
|---|---|---|
| 1,031,602 | Wechsler | July 2, 1912 |
| 2,103,495 | Ruckdeschel | Dec. 28, 1937 |